Sept. 21, 1937.                    H. M. SMALLEN                    2,093,698
                              MARKING AND CUTTING DEVICE
                              Original Filed Feb. 8, 1936
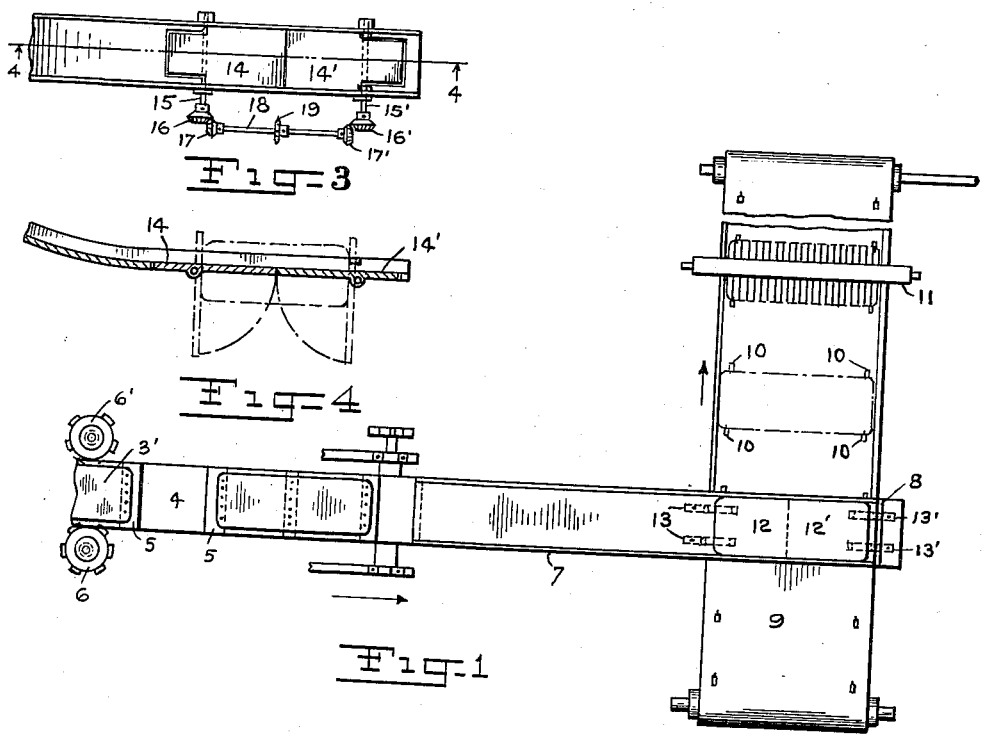
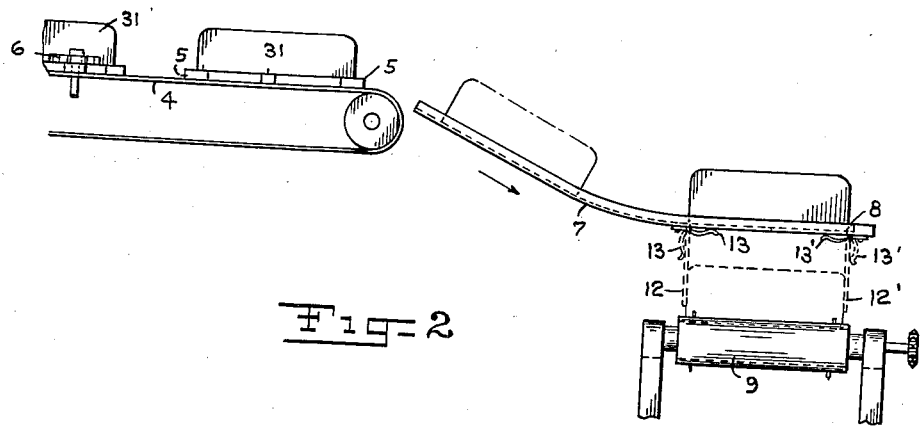
INVENTOR.
BY
ATTORNEY.

Patented Sept. 21, 1937

2,093,698

UNITED STATES PATENT OFFICE 2,093,698

MARKING AND CUTTING DEVICE

Harry M. Smallen, Brooklyn, N. Y.

Application February 8, 1936, Serial No. 62,905
Renewed February 18, 1937

3 Claims. (Cl. 101—35)

My invention relates to improvements in marking or branding and slicing machines, and more particularly, has reference to and is illustrated in the accompanying drawing in its application to a machine of the class described, especially adapted for applying a series or succession of marks or brands upon a loaf of bread, so that when the bread is sliced, each slice of bread is branded on the crust and at opposite sides, the same being a continuation in part of my co-pending patent application Serial Number 710,861.

Referring to the accompanying drawing, Fig. 1 illustrates in plan view, a suitable form of branding and slicing machine embodying an application of my invention, parts being broken away, the details of a suitable form of branding machine being more particularly set forth in my said co-pending case. Fig. 2 is a view in side elevation of the machine shown in Fig. 1, Fig. 3 is a detail in plan view of modified means for passing the branded loaf to the slicer, and Fig. 4 is a view in side elevation of the same.

6, 6' indicates the branding or marking wheels for applying a succession of spaced apart marks on opposite sides of a loaf of bread 31, and 4 is a conveyor with positioning strips 5 for moving the loaf along between said marking wheels 6, 6', to the end of the conveyor where each loaf slides down the chute 7 to a stop 8, where it rests until another conveyor 9 engages it between the positioning elements 10 and moves the loaf in a direction at right angles to its first path of movement. The positioning of the loaves by the strips 5, and the position of the stop 8 predetermine the exact opposite position of the markings at opposite sides of the loaf, so that as the loaf moves with the second conveyor 9, the separated cutting knives on spindle 11 pass between the markings and not through the same, thus cutting the loaf into slices, each of which is separately branded or marked in the same position upon the side crusts, and of course the sliced loaf may then pass to the wrapping machine.

In passing each loaf successively from the branding machine conveyor 4 to the cutter conveyor 9, it may come to rest upon the trap doors 12, 12' retained by springs 13, 13' which allow the loaf to drop upon the cutter conveyor 9 in predetermined position, from which point the loaf is passed at right angles to the cutters. The stop 8 positions the loaf before it is released by the springs 13, 13'. These projected resilient springs may be pivoted as shown to release and drop the loaf from the doors in predetermined position upon the second conveyor, and the engaging elements 10 between which the loaf is dropped, are sufficiently narrow to pass between the knives of the slicer.

Referring more particularly to Figs. 3 and 4, it will be observed that a pair of trap doors 14, 14' may be secured on shafts 15, 15' having pinions 16, 16' meshing with pinions 17, 17' on shaft 18, carrying drive pinion 19, which may be timed and rotated by suitable transmission to release the loaf when it strikes the stop 8, the shafts 15, 15' rotating 90 degrees allowing the doors to stand vertically to correctly guide the loaf down upon the conveyor 9, between the positioning fingers 10.

Of course it will be understood that various modifications may be made in the construction and arrangement of parts, without departing from the spirit of the invention, as claimed.

I claim:

1. In a machine of the class described, means for applying a series of marks in predetermined position to an article, and in combination therewith means for severing the marked portions of said article between said marks, said last mentioned means including means for feeding said marked article in a direction at right angles to said first mentioned means.

2. In a machine of the class described, means for applying a series of marks in predetermined position to an article, and in combination therewith means for severing the marked portions of said article between said marks, said last mentioned means including means for feeding said article in a direction at right angles to said last mentioned means, and along a path below the path of travel of said articles when being marked.

3. In a machine of the class described, means for applying a series of marks in predetermined position to an article, and in combination therewith means for severing the marked portions of said article between said marks, said last mentioned means including means for feeding said marked article in a direction at right angles to said first mentioned means, and for guiding said article from its position on said first mentioned feeding means.

HARRY M. SMALLEN.